(12) United States Patent
Takahata

(10) Patent No.: US 10,208,705 B2
(45) Date of Patent: Feb. 19, 2019

(54) ENGINE EQUIPPED WITH WIRE HARNESS COVER

(71) Applicant: YANMAR CO., LTD., Osaka-shi (JP)

(72) Inventor: Terumitsu Takahata, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 0 days.

(21) Appl. No.: 15/128,088

(22) PCT Filed: Aug. 22, 2014

(86) PCT No.: PCT/JP2014/072022
§ 371 (c)(1),
(2) Date: Sep. 21, 2016

(87) PCT Pub. No.: WO2015/145801
PCT Pub. Date: Oct. 1, 2015

(65) Prior Publication Data
US 2017/0130668 A1    May 11, 2017

(30) Foreign Application Priority Data
Mar. 24, 2014  (JP) .................. 2014-059675

(51) Int. Cl.
*F02F 7/00* (2006.01)
*B60R 16/02* (2006.01)

(52) U.S. Cl.
CPC ........ *F02F 7/0068* (2013.01); *B60R 16/0215* (2013.01)

(58) Field of Classification Search
CPC ....... F02F 7/0068; F02F 7/0065; F02B 77/00; B60R 16/0215; B60R 16/0207;
(Continued)

(56) References Cited

U.S. PATENT DOCUMENTS

| 5,739,470 A * | 4/1998 | Takeda ................. H02G 3/0487 174/101 |
| 6,380,488 B1 * | 4/2002 | Takeda ................ B60R 16/0215 174/135 |

(Continued)

FOREIGN PATENT DOCUMENTS

| EP | 1589801 A2 | 10/2005 |
| EP | 1589801 A2 | 10/2015 |

(Continued)

OTHER PUBLICATIONS

Machine translation, Detailed Description of JP2012117384A, Shioda, obtained from https://worldwide.espacenet.com/, pp. 1-18.*

(Continued)

*Primary Examiner* — Grant Moubry
(74) *Attorney, Agent, or Firm* — Norton Rose Fulbright US LLP

(57) ABSTRACT

In the engine having a plurality of wire harnesses, a groove section is formed by conductive walls configured to surround a part of the outer peripheral surface of selected one of the wire harnesses. Another one of the wire harnesses is attached to a wire harness cover fixed to the engine by a plate section extended from the groove section in such a manner that the another one of the wire harnesses is disposed adjacent to the selected one of the wire harnesses with one of the walls being interposed inbetween.

20 Claims, 10 Drawing Sheets

(58) Field of Classification Search
CPC .. B60R 16/02; H01B 7/00; H01B 7/17; H01B 7/18; H01B 7/0045; H01B 11/10
USPC .......................................... 123/198 E, 195 C
See application file for complete search history.

(56) References Cited

U.S. PATENT DOCUMENTS

| | | | | |
|---|---|---|---|---|
| 6,844,496 | B2* | 1/2005 | Matsuda | B60R 16/0207 174/72 A |
| 6,861,589 | B2* | 3/2005 | Katsumata | H02G 3/0487 174/101 |
| 7,592,546 | B2 | 9/2009 | Johansson | |
| 8,847,073 | B2* | 9/2014 | Tokunaga | B60R 16/0215 174/68.1 |
| 9,776,581 | B2* | 10/2017 | Oga | B60R 16/0215 |
| 9,793,031 | B2* | 10/2017 | Sakaki | B60R 16/0207 |
| 2006/0144612 | A1 | 7/2006 | Johansson | |
| 2014/0317921 | A1* | 10/2014 | Yamamoto | H01B 13/012 29/856 |
| 2015/0165985 | A1* | 6/2015 | Morris | B60R 16/0215 248/65 |

FOREIGN PATENT DOCUMENTS

| | | |
|---|---|---|
| JP | H09-065542 A | 3/1997 |
| JP | 2005-254855 A | 9/2005 |
| JP | 2007-221875 A | 8/2007 |
| JP | 2011-087415 A | 4/2011 |
| JP | 2012-117384 A | 6/2012 |
| WO | 98/28563 A1 | 7/1998 |

OTHER PUBLICATIONS

Extended European Search Report dated Dec. 1, 2017 for Application No. 14887091.8 in 6 pages.

* cited by examiner

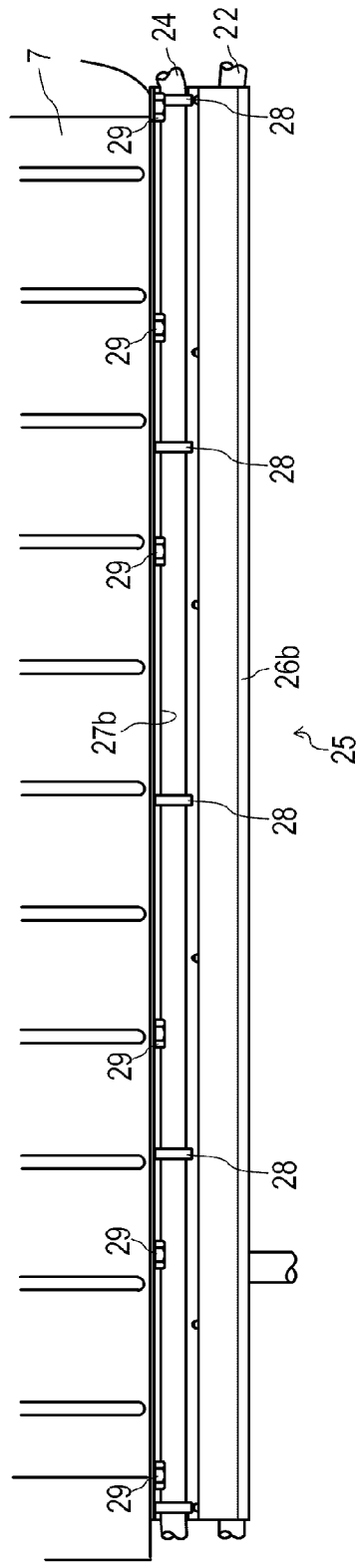
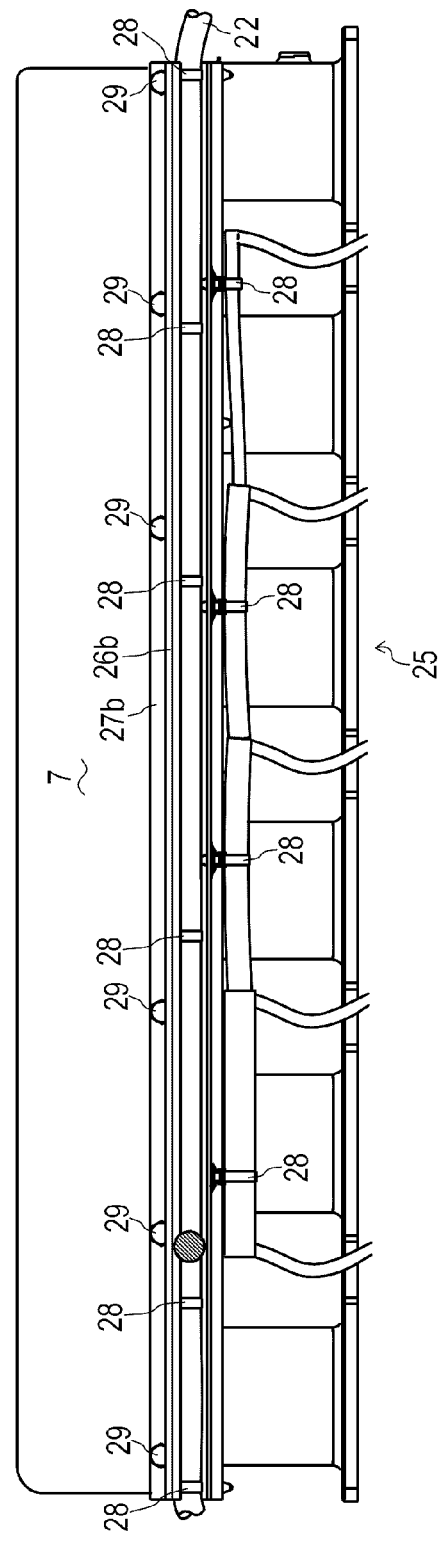

ENGINE EQUIPPED WITH WIRE HARNESS COVER

CROSS-REFERENCE TO RELATED APPLICATIONS

This application is the U.S. National Phase under 35. U.S.C. § 371 of International Application PCT/JP2014/072022, filed Aug. 22, 2014, which claims priority to Japanese Patent Application No. 2014-059675, filed Mar. 24, 2014. The disclosures of the above-described applications are hereby incorporated by reference in their entirety.

TECHNICAL FIELD

The present invention relates to an engine. Specifically, the present invention relates to an engine equipped with a wire harness cover.

BACKGROUND ART

Conventionally, an engine includes electric components such as fuel injection nozzles, an alternator, and many types of sensors. These electric components are connected through wire harnesses each of which binds power supply lines for transmitting electric power or signal lines for transmitting signals in a form suitable for a wiring route. In such an engine, power supply lines for fuel injection nozzles and the like, power supply lines for sensors and the like, signal lines for sensors and the like are sorted according to functions, and each of the sorted groups of lines is configured as a wire harness. See Patent Document 1, for example.

The engine according to Patent Document 1 is wired with wire harnesses that are sorted into wire harnesses including only power supply lines which are apt to generate noise (electromagnetic wave) and wire harnesses including only signal lines which are susceptible to the noise. The wire harnesses including only power supply lines and the wire harnesses including only signal lines are further bound together and mounted on the engine. However, the wire harnesses are bound together in arbitrary forms and fixed to the engine, and thus variations occur in the binding ways and the mounting positions on the engine. Accordingly, the wire harnesses may be bound in a state in which influence of the noise cannot be sufficiently suppressed or in a state in which the wire harnesses easily contact the neighboring components.

PRIOR ART DOCUMENT

Patent Document

PTL1: JP 2012-117384 A

SUMMARY OF THE INVENTION

Problems to Be Solved By the Invention

The present invention has been made in view of the above problems, and an object of the present invention is to provide an engine capable of protecting wire harnesses from mechanical contact and also suppressing influence of noise between wire harnesses.

Solutions to the Problems

According to an aspect of the invention, there is provided an engine having a plurality of wire harnesses, and a groove section is formed by conductive walls configured to surround a part of the outer peripheral surface of one of the wire harnesses. Another one of the wire harnesses is attached to a wire harness cover fixed to the engine by a plate section extended from the groove section in such a manner that the another one of the wire harnesses is disposed adjacent to the one of the wire harnesses with one of the walls being interposed inbetween.

According to the aspect of the present invention, one of the wire harnesses can be mounted on one of the walls of the groove section on the side of the engine or on the plate section.

According to the aspect of the present invention, one of the wire harnesses for transmitting signals and another one of the wire harnesses configured to transmit electric power are electromagnetically separated by one of the walls.

Effects of the Invention

The present invention exhibits the following effects.

According to an aspect of the present invention, wire harnesses are surrounded by a wire harness cover, and a conductive wall is disposed between the wire harnesses. This configuration makes it possible to protect the wire harnesses from mechanical contact, and also makes it possible to suppress influence of noise between wire harnesses.

BRIEF DESCRIPTION OF THE DRAWINGS

FIG. 8A is a side view of a state in which the wire harnesses are attached to the wire harness cover of the engine according to one embodiment of the present invention, and FIG. 8B is a bottom plan view of the same.

EMBODIMENTS OF THE INVENTION

An engine 1 equipped with a wire harness cover 25 according to a first embodiment of the present invention is described below with reference to FIGS. 1 to 3.

Figure 1:
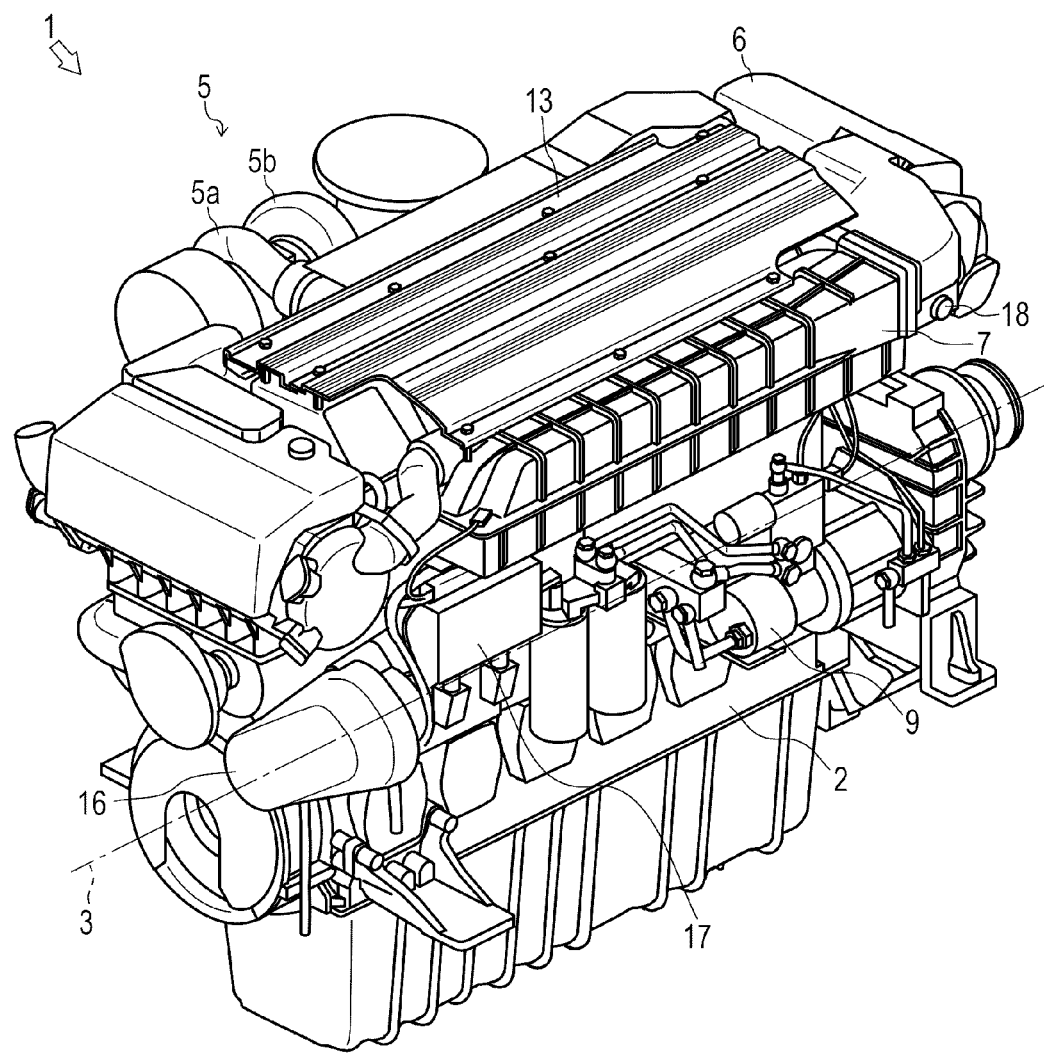
FIG. 1 is a perspective view of an engine according to one embodiment of the present invention.
Figure 2:
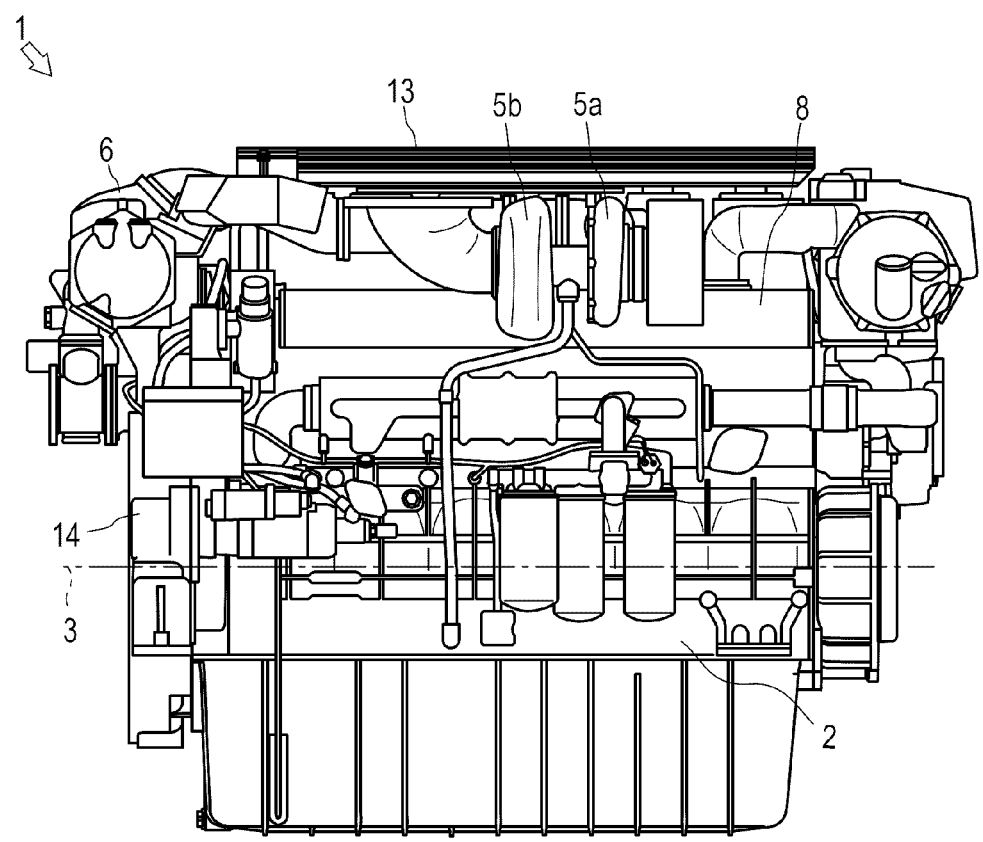
FIG. 2 is a side view of the engine according to one embodiment of the present invention.

As show in FIGS. 1 and 2, the engine 1 is a diesel engine. According to the present embodiment, the engine 1 is an in-line six cylinder engine having six cylinders. Although the present embodiment relates to an in-line six cylinder engine including one supercharger 5, the present invention is not limited thereto.

The engine 1 mixes and burns external air and fuel to generate rotation power. In the engine 1, a crank shaft (not shown) is rotatably supported by a cylinder block 2, and the six cylinders (not shown) are arranged at regular intervals in a direction of an axis 3 of the crank shaft. The engine 1 includes a cylinder head 4 having an intake device configured to take external air in the cylinders, an exhaust device configured to exhaust the air to the outside, and a fuel supply device configured to supply fuel to the cylinders. The engine 1 further includes a starter 14 configured to rotate the crank shaft, an alternator 16 that is a generator, and an engine control unit (ECU) 17 configured to control the engine 1.

The intake device includes a compressor 5a of the supercharger 5, an intercooler 6, and an intake manifold 7.

The supercharger 5 is driven by exhaust pressure of the air to compress intake air. The supercharger 5 includes the compressor 5a and a turbine 5b. The compressor 5a of the supercharger 5 is configured to compress intake air. The compressor 5a is joined to the turbine 5b. The compressor 5a is configured to be capable of transmitting rotation power from the turbine 5b. The compressor 5a is connected with the intercooler 6.

The intercooler 6 is configured to cool the intake air. The intercooler 6 is configured to exchange the heat of compressed intake air (hereinafter, the compressed intake air is referred to as charged air) with cooling water supplied by a cooling water pump (not shown) to cool the charged air. The intercooler 6 is connected with the intake manifold 7.

The intake manifold 7 is configured to distribute the charged air to the cylinders of the engine 1. The intake manifold 7 is disposed in the direction of the axis 3 of the crank shaft of the engine 1 and is connected with the cylinder head 4 that forms a part of the cylinders from one side of the engine 1. The intake manifold 7 is configured to be capable of supplying the charged air that has been cooled at the intercooler 6 to the cylinders through intake valves (not shown) provided on the upper side of the cylinders.

The exhaust device includes an exhaust manifold 8 that is an exhaust pipe, and the turbine 5b of the supercharger 5.

The exhaust manifold 8 is configured to collect exhaust air from the cylinders. The exhaust manifold 8 is disposed in the direction of the axis 3 of the crank shaft of the engine 1 and is connected with the cylinder head 4 that forms a part of the cylinders from the other side of the engine 1. The exhaust manifold 8 is configured to collect the exhaust air from the cylinders through exhaust valves (not shown) provided on the upper side of the cylinders to exhaust the collected air to the outside.

The turbine 5b of the supercharger 5 is configured to generate rotation power by exhaust pressure. The turbine 5b is joined with the compressor 5a to be capable of transmitting the rotation power to the compressor 5a. The turbine 5b is connected with the exhaust manifold 8. The turbine 5b is configured to communicate with the outside through the exhaust pipe.

As described above, in the intake device, the compressor 5a of the supercharger 5, the intercooler 6, and intake manifold 7 are connected sequentially from the upstream side (the outside). In the exhaust device, the exhaust manifold 8 and the turbine 5b of the supercharger 5 are connected sequentially from the upstream side (the side of the engine 1).

In the intake device, external air (intake air) is taken and compressed by the compressor 5a of the supercharger 5. At this time, compression heat is generated by the compression and the temperature of the intake air rises. The intake air compressed at the compressor 5a is exhausted as charged air from the supercharger 5. The charged air exhausted from the supercharger 5 is supplied to the intercooler 6. The charged air supplied to the intercooler 6 is cooled and then supplied to the engine 1 through the intake manifold 7.

In the exhaust device, exhaust air from the engine 1 is supplied to the turbine 5b of the supercharger 5 through the exhaust manifold 8. The turbine 5b is rotated by exhaust air. The rotation power of the turbine 5b is transmitted to the compressor 5a. The exhaust air supplied to the turbine 5b is exhausted to the outside through a purifier device and the like (not shown).

Figure 3:
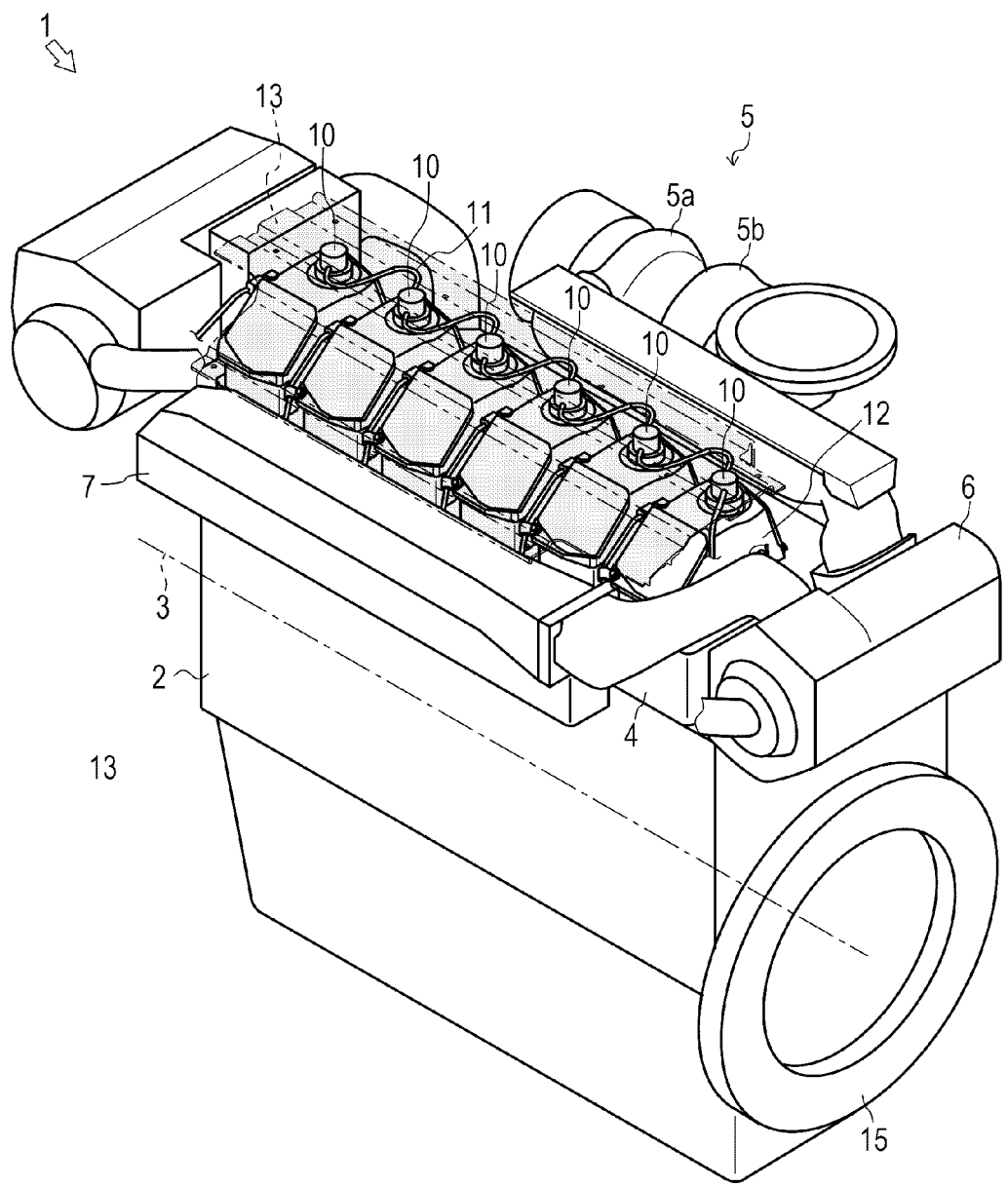
FIG. 3 is a perspective view of fuel injection nozzles and a fuel pipe of the engine according to one embodiment of the present invention.

As shown in FIGS. 1 and 3, the fuel supply device includes a fuel injection pump 9 and fuel injection nozzles 10.

The fuel injection pump 9 is configured to transmit fuel by pressure. The fuel injection pump 9 is configured to exhaust the fuel supplied from a fuel tank (not shown) at a high pressure by a feed pump (not shown). The fuel injection pump 9 is disposed at one side surface of the engine 1. The fuel injection pump 9 is connected with one of the plurality of fuel injection nozzles 10 through a fuel pipe 11.

The fuel injection nozzles 10 are configured to inject fuel into the cylinders, respectively. The fuel injection nozzles 10 are provided on the cylinders respectively so that their ends on one side having fuel injection ports are positioned in the respective cylinders. In other words, the plurality of fuel injection nozzles 10 are arranged in the direction of the axis 3 of the crank shaft on the cylinder head 4 that forms a part of the cylinders. One end on the other side of one of the fuel injection nozzles 10 that is disposed at the endmost in the direction of the axis 3 of the crank shaft is connected with the fuel injection pump 9 through the fuel pipe 11. The other end of the endmost one of the fuel injection nozzles 10 is connected with adjacent one of the fuel injection nozzles 10 through the fuel pipe 11. Further, adjacent ones of the fuel injection nozzles 10 are connected with each other at their ends on the other side through the fuel pipe 11. In other words, the fuel injection nozzles 10 are connected in series through the fuel pipe 11.

The engine 1 configured in the above manner includes valve arm chambers each of which covers an intake valve and an exhaust valve (not shown) disposed on the upper side of one of the cylinders with a valve cover 12. On the other hand, each of the fuel injection nozzles 10 is provided in such a manner that an end on the other side with which the fuel pipe 11 is connected is projected from the valve cover 12. In other words, the fuel pipe 11 is disposed outside of the valve cover 12 in the engine 1. In addition, the engine 1 further includes a top cover 13 provided on the upper side of the valve cover 12 to protect the intake manifold 7 and the fuel injection nozzles 10 and prevent fuel scattering caused by damage to the fuel pipe 11.

The starter 14 is configured to rotate the crank shaft. The starter 14 is configured by an electric actuator such as a motor. The starter 14 is joined and interlocked with a flywheel 15 that is connected with the crank shaft through a gear (not shown) and the like.

The alternator 16 is configured to generate electricity. The alternator 16 is joined and interlocked with the crank shaft through a belt (not shown) and the like. The alternator 16 generates electricity by utilizing driving force of the engine.

The ECU 17 is configured to control the engine 1. The ECU 17 may be substantially configured by a CPU, a ROM, a RAM, an HDD and the like connected by a bus, or configured by a one-chip LSI or the like. The ECU 17 is connected with the starter 14, the alternator 16, an emergency stop switch 18, and sensors, such as a rotation number detection sensor 19, an intake temperature sensor 20, and a cooling water temperature sensor 21.

The wire harnesses and the wire harness cover 25 of the engine 1 are described below with reference to FIGS. 4A to 8B.

Each of the wire harnesses is a collective component in which a plurality of power supply lines and signal lines are bound together in accordance with the status of wirings. Each of the wire harnesses can be connected with electric components such as the electric actuator, sensors, and the like by using connectors provided at ends of the power supply lines and the signal lines that are bound together.

Figure 4A:
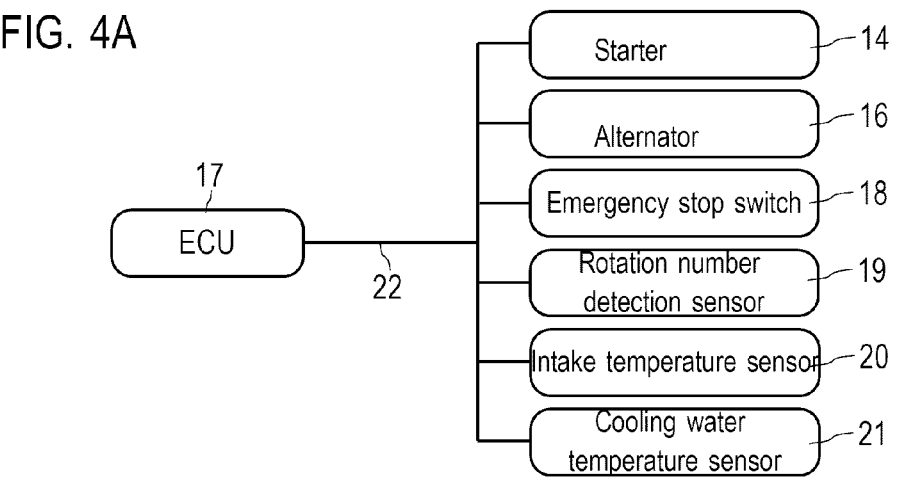
FIG. 4A shows a structure of a communication wire harness of the engine according to one embodiment of the present invention.
Figure 4B:
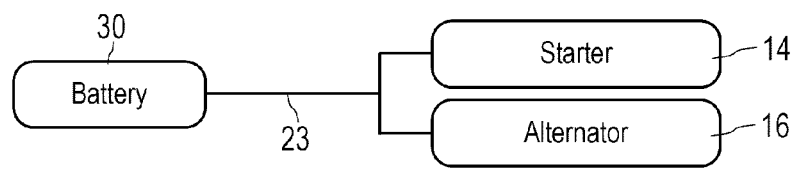
FIG. 4B shows a structure of a first power supply wire harness of the same.
Figure 4C:
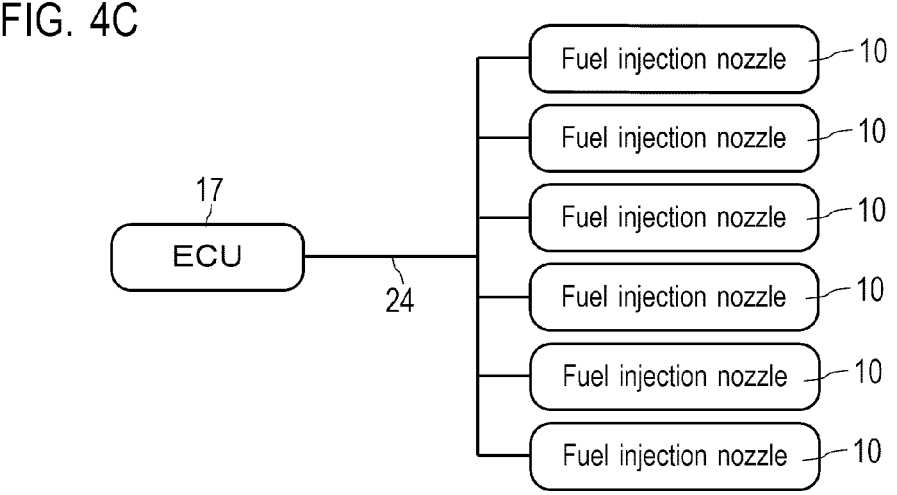
FIG. 4C shows a structure of a second power supply wire harness of the same.

As shown in FIGS. 4A to 4C, there is provided a wire harness that binds only signal lines for transmitting signals from the starter 14, the alternator 16, the emergency stop switch 18, and sensors such as the rotation number detection sensor 19, the intake temperature sensor 20, and the cooling water temperature sensor 21 to the ECU 17 (hereinafter simply referred to as a "signal wire harness 22"). There is also provided a first power supply wire harness 23 that binds only electric lines for transmitting electric power from a battery 30 to the starter 14 and the alternator 16 (hereinafter simply referred to as "power supply wire harness"). Likewise, there is provided a second power supply wire harness 24 that binds power supply lines for transmitting electric power from the ECU to the six fuel injection nozzles 10.

Figure 5:
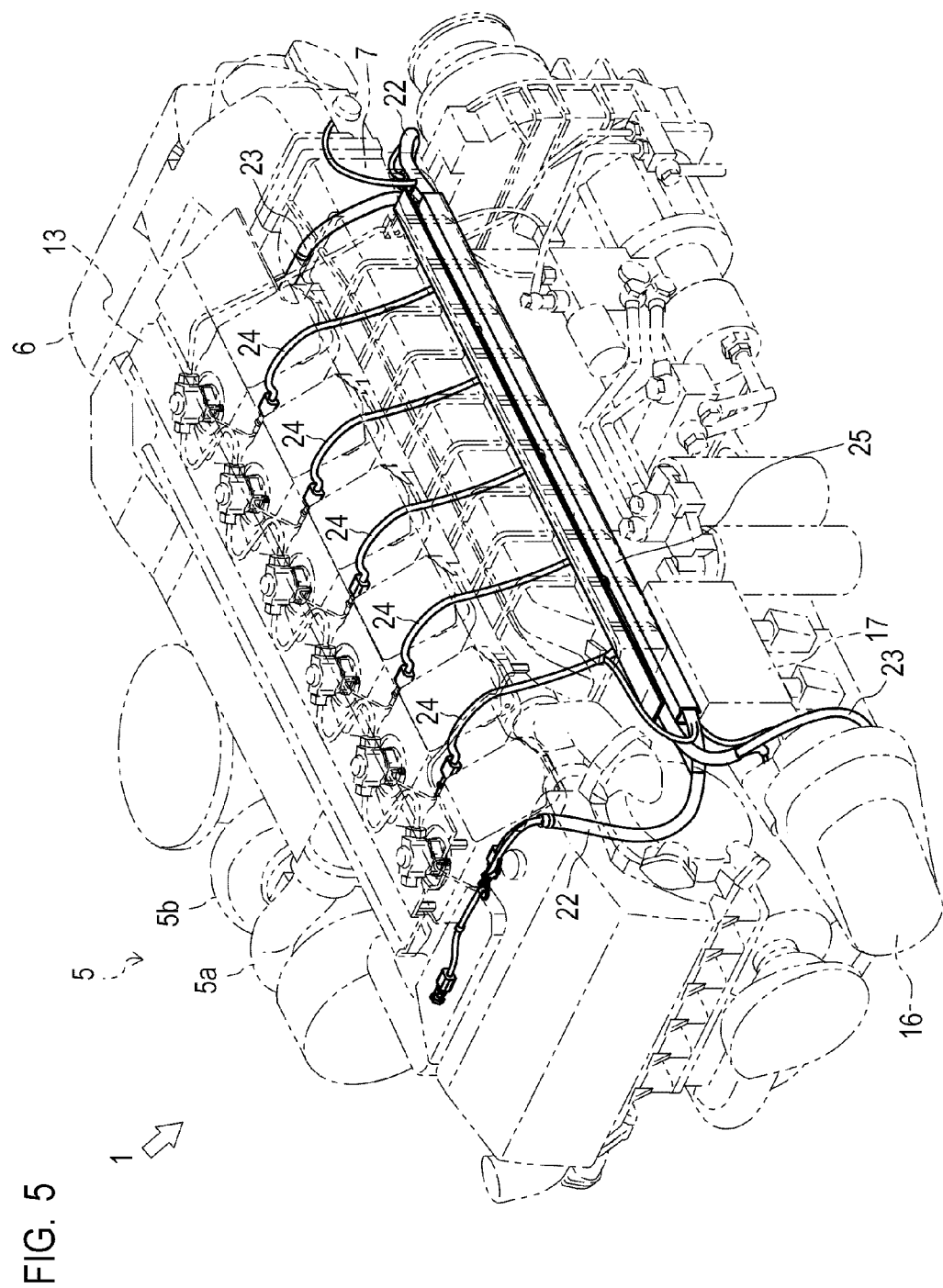
FIG. 5 is a perspective view of an arrangement of the wire harnesses of the engine according to one embodiment of the present invention.

As shown in FIG. 5, each of the signal wire harness 22, the first power supply wire harness 23, and the second power supply wire harness 24 is held by the wire harness cover 25, and connected with a part of the engine passing through a predetermined path.

Figure 6:
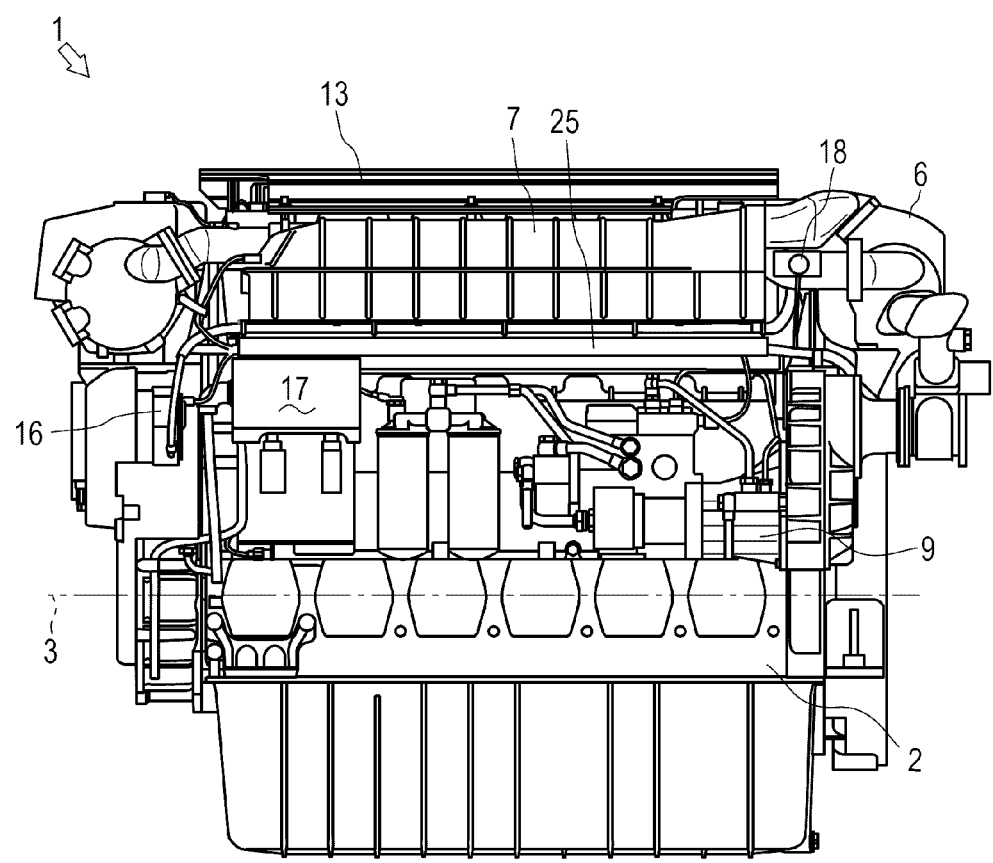
FIG. 6 is a side view of an arrangement of a wire harnesses cover of the engine according to one embodiment of the present invention.

As shown in FIGS. 5 and 6, the wire harness cover 25 is configured to protect a single or a plurality of wire harnesses. The wire harness cover 25 is formed from a pultruded aluminum alloy which is a conductive material. The wire harness cover 25 is formed in a substantially rod-like shape and is mounted on the intake manifold 7 in the direction of the axis 3 of the crank shaft.

Figure 7A:
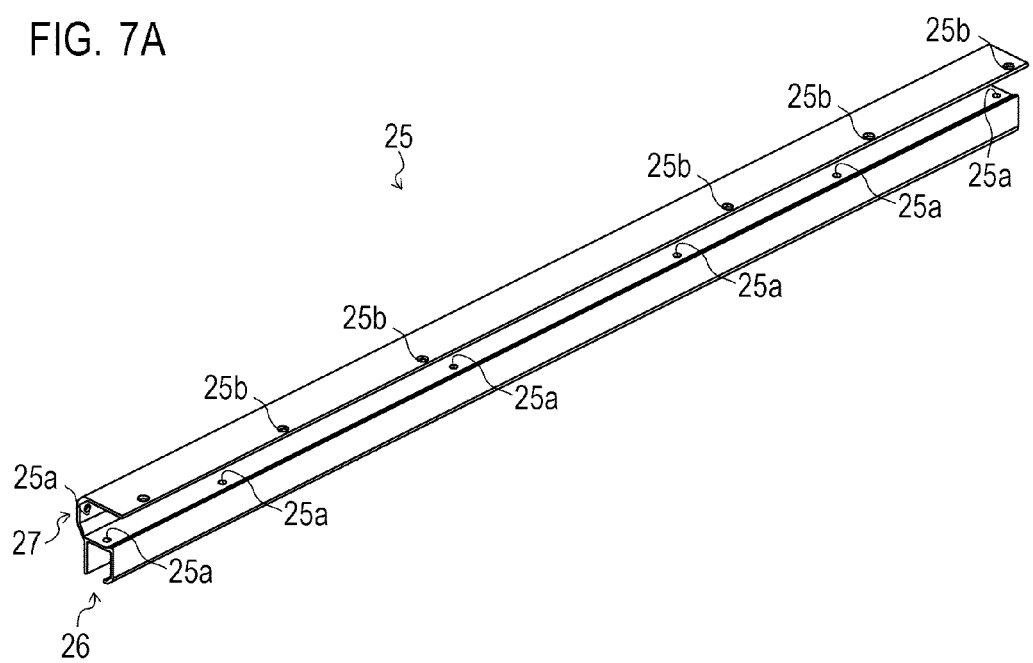
FIG. 7A is a perspective view of a form of the wire harness cover of the engine according to one embodiment of the present invention.
Figure 7B:
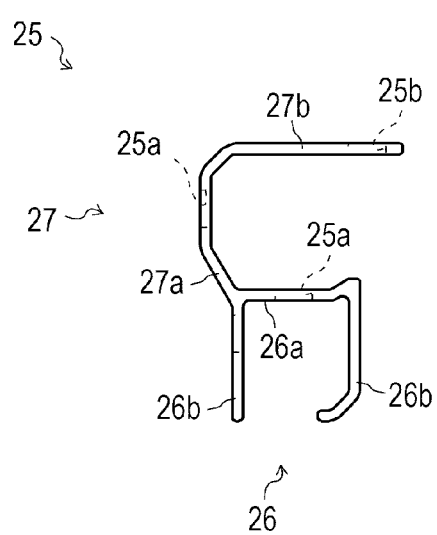
FIG. 7B is an end view of the same.

As shown in FIGS. 7A and 7B, the wire harness cover 25 includes a groove section 26 and a plate section 27. The groove section 26 is a part that holds a wire harness in a surrounding manner. The groove section 26 is formed to have a rectangular shape in a sectional view perpendicular to a longitudinal direction. The groove section 26 is formed in such a manner that both end surfaces and one of the side surfaces in a longitudinal direction are opened. In other words, in the groove section 26, side walls 26b are substantially vertically formed from both sides of a bottom surface 26a in a longitudinal direction, where the bottom surface 26a is one of the side surfaces opposing to the opened side surface. The plate section 27 is a part holding a wire harness and connected with the engine 1 (intake manifold 7). The plate section 27 is formed in a substantially L-shape in a sectional view perpendicular to the longitudinal direction. The plate section 27 is connected with the groove section 26 in such a manner that one side 27a is disposed in a longitudinal direction. Specifically, the one side 27a of the plate section 27 is connected in a vicinity of one of the side walls 26b of a surface corresponding to the bottom surface 26a among outer side surfaces of the groove section 26. The plate section 27 is disposed in such a manner that the other side 27b faces the other one of the side walls 26b of the groove section 26.

The bottom surface 26a and one of the side walls 26b of the groove section 26, and a plate face of the one side 27a of the plate section 27 include a plurality of attaching holes 25a configured to fix clamp members 28 for holding wire harnesses. A plate face of the other side 27b of the plate section 27 includes a plurality of attaching holes 25b configured to fix the wire harness cover 25 onto the intake manifold 7.

Figure 9:
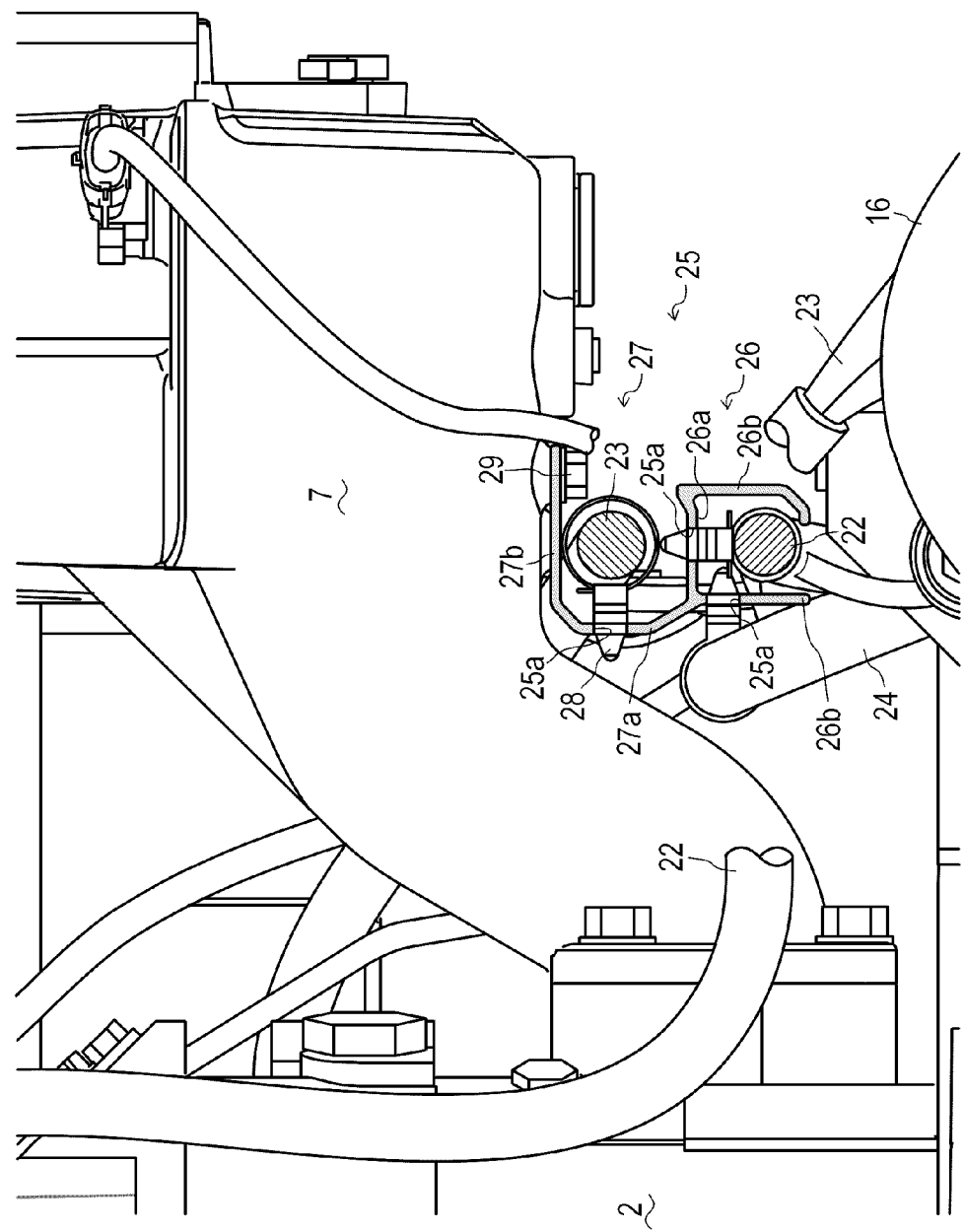
FIG. 9 is a sectional view of the state in which the wire harnesses are attached to the wire harness cover of the engine according to one embodiment of the present invention.

As shown in FIGS. 8A, 8B, and 9, the wire harness cover 25 is fixed to a lower part of the intake manifold 7 by fixing the other side 27b of the plate section 27 with bolts 29 in such a manner that the longitudinal direction of the wire harness cover 25 is disposed in the direction of the axis 3 of the crank shaft of the engine 1. In other words, the wire harness cover 25 is disposed at the lower part of the intake manifold 7 through the plate section 27 with the groove section 26 being opened downwardly. The wire harness cover 25 is disposed in such a manner that one of the side walls 26b on which the attaching holes 25a for fixing the clamp members 28 are formed is placed on the side of the engine 1.

As shown in FIG. 9, the signal wire harness 22 is fixed to a predetermined position in the groove section 26 of the wire harness cover 25 with the clamp members 28. In other words, a part of the outer peripheral surface of the signal wire harness 22 is surrounded by the bottom surface 26a and the side walls 26b of the groove section 26 formed by aluminum alloy which is a conductive material. With this configuration, the signal wire harness 22 is isolated electromagnetically by the wire harness cover 25, and thus electromagnetic compatibility (EMC) of the signal wire harness 22 can be improved. The signal wire harness 22 is disposed in a state protected by the wire harness cover 25. Each of the signal lines branched from the signal wire harness 22 is wired to a part from the opened side of the groove section 26.

The first power supply wire harness 23 is fixed to a predetermined position between one side 27a which is the bottom surface 26a of the groove section 26 and the other side 27b of the plate section 27 of the wire harness cover 25 with the clamp members 28. In other words, the first power supply wire harness 23 is fixed adjacent to the signal wire harness 22 through the bottom surface 26a of the groove section 26 (with the bottom surface 26a of the groove section 26 being interposed inbetween). The first power supply wire harness 23 is positioned between the bottom surface 26a of the groove section 26 and the other side 27b of the plate section 27 of the wire harness cover 25.

The second power supply wire harness 24 is fixed to a predetermined position of one of the side walls 26b of the groove section 26 on the side of the engine 1 with the clamp members 28. In other words, the second power supply wire harness 24 is fixed adjacent to the signal wire harness 22 through one of the side walls 26b of the groove section 26 (with one of the side walls 26b of the groove section 26 being interposed inbetween). The second power supply wire harness 24 is disposed between the wire harness cover 25 and the engine 1 (cylinder block 2). With this configuration, the first power supply wire harness 23 and the second power supply wire harness 24 are wired in an appropriate manner while being surrounded by the cylinder block 2 and the wire harness cover 25.

In the engine 1 configured in above manner, a current flows in the first power supply wire harness 23 to transmit electric power to the starter 14 or transmit electric power generated by the alternator 16 to the battery 30 when the engine 1 is started or the battery 30 is charged. At the time of starting the engine 1 and during operation of the engine 1, a current flows in the second power supply wire harness 24 to transmit electric power to the fuel injection nozzles 10. During operation of the engine 1, a weak current flows in the signal wire harness 22 to transmit the signals from sensors to the ECU 17.

Since a current flowing in each of the first power supply wire harness 23 and the second power supply wire harness 24 is large, a strong noise (electromagnetic wave) occurs. On the other hand, since a current flowing in the signal wire harness 22 is small, the signal wire harness 22 is largely influenced by variation of an output waveform due to an external noise or the like and causes malfunctions. However, the signal wire harness 22 is electromagnetically isolated by the wire harness cover 25 from the first power supply wire harness 23 and the second power supply wire harness 24 that generate electromagnetic waves, and thus the influence of the electromagnetic wave is reduced. The signal wire harness 22, the first power supply wire harness 23 and the second power supply wire harness 24 are mechanically isolated by the wire harness cover 25, and thus hardly contact with peripheral components or the like. With this configuration, the engine 1 can protect the wire harnesses from mechanical contacts and also suppress influence of noise between the wire harnesses.

Note that the wire harness cover 25 is configured by the groove section 26 having a rectangular shape in a sectional view and the plate section 27 in a substantially L-shape according to the present embodiment, but is not limited thereto. The wire harness cover 25 may have a configuration in which a wire harness selected from the plurality of wire harnesses is surrounded in such a manner that a side wall is interposed between the selected one of the wire harnesses and another one of the wire harnesses. Furthermore, according to the present embodiment, the wire harness cover 25 is fixed to the intake manifold 7, but is not limited thereto.

Lastly, a ship 100 which is one embodiment of a ship on which the engine 1 according to the present invention is mounted is described below with reference to FIG. 10.

Figure 10:
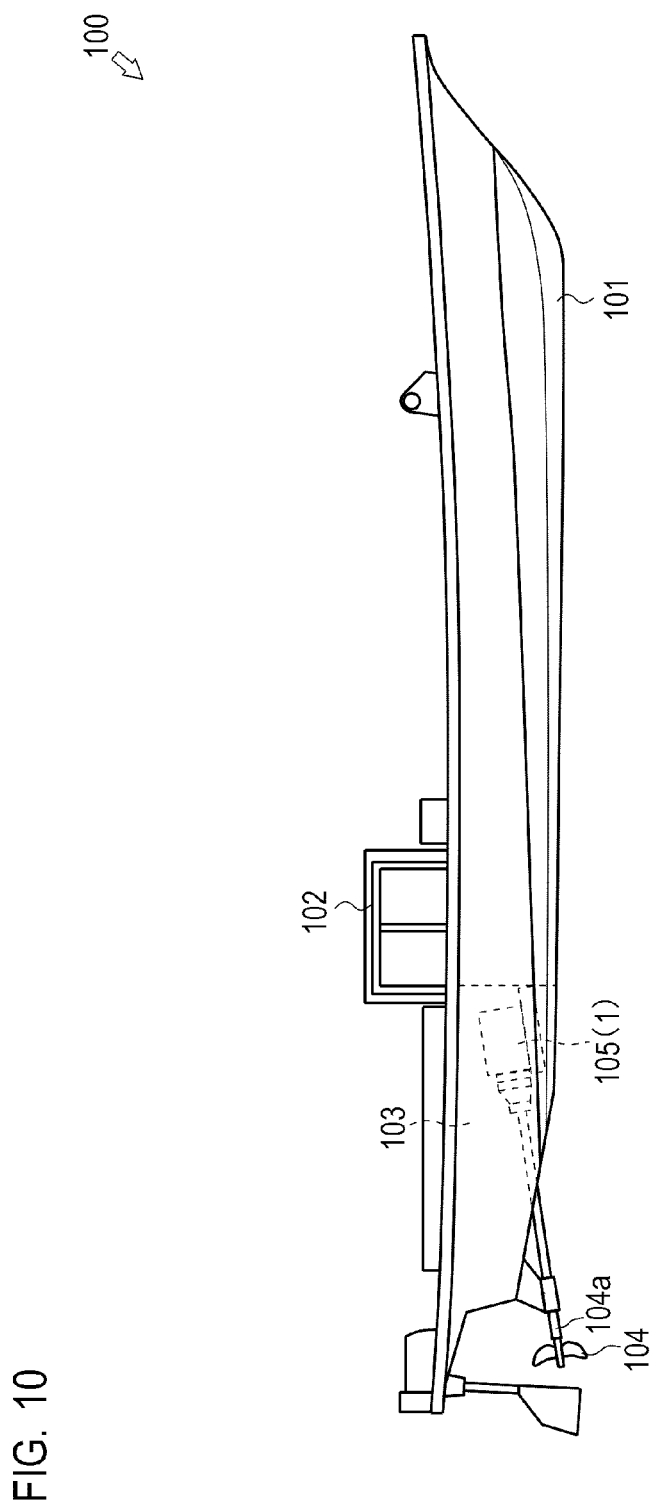
FIG. 10 is a schematic view of a structure of a ship on which the engine according to one embodiment of the present invention is mounted.

As shown in FIG. 10, the ship 100 includes a hull 101, a steering chamber 102, an engine room 103, a propeller 104, and the like. The ship 100 includes the steering chamber 102 on the upper part of the hull 101. The ship 100 includes the engine room 103 at a rear part of the hull 101. The engine room 103 includes a main engine 105 that is an internal combustion engine that drives the propeller 104. The stern of the hull 101 includes the propeller 104. The ship 100 has a configuration in which the power of the main engine 105 can be transmitted to the propeller 104 through the propeller shaft 104a.

Here, the main engine 105 is configured by the engine 1 which is a diesel engine using light oil or heavy oil as a fuel. The engine 1 rotates an output shaft by mixing and burning external air and fuel. Note that the engine 1 is not limited to a diesel engine.

INDUSTRIAL APPLICABILITY

The engine according to the present invention is applicable to an automobile engine, a small industrial engine mounted on a construction machine, an agricultural machine, or the like, and a main engine and an auxiliary engine mounted on a large ship such as a container ship.

DESCRIPTION OF REFERENCE SIGNS

1: Engine
25: Wire harness cover
26: Groove section
27: Plate section

What is claimed is:

1. An engine comprising:
a plurality of wire harnesses comprising a first wire harness and a second wire harness;
a wire harness cover comprising:
a groove section formed by conductive walls configured to surround a part of an outer peripheral surface of the first wire harness, and
a plate section extending from the groove section, the plate section fixing the wire harness cover to the engine; and
a plurality of clamps comprising a first set of clamps and a second set of clamps, the first set of clamps coupled to the groove section and configured to hold the first wire harness, and the second set of clamps coupled to the plate section and configured to hold the second wire harness,
wherein the first wire harness is disposed adjacent to the second wire harness with one of the conductive walls being interposed between the adjacent wire harnesses, and
the plate section is configured to hold the second wire harness.

2. The engine according to claim 1, wherein the one of the conductive walls of the groove section on a side of the engine is configured to hold the second wire harness.

3. The engine according to claim 2, wherein the first wire harness and the second wire harness are electromagnetically separated by one of the conductive walls.

4. The engine according to claim 1, wherein the first wire harness and the second wire harness are electromagnetically separated by one of the conductive walls.

5. The engine according to claim 1, wherein:
the wire harness cover comprises:
a first end; and
a second end, and
the wire harness cover extends in a longitudinal direction between the first end and the second end.

6. The engine according to claim 5, wherein:
the groove section includes a rectangular shape in a sectional view perpendicular to the longitudinal direction; and
the plate section is formed in a substantially L-shape in a sectional view perpendicular to the longitudinal direction.

7. The engine according to claim 5, wherein:
the groove section defines a first channel that extends in the longitudinal direction between the first end and the second end; and
the plate section defines a second channel that extends in the longitudinal direction between the first end and the second end.

8. The engine according to claim 7, wherein:
the groove section comprises a first sidewall, a first bottom wall, and a second sidewall; and
the first channel is defined by the first sidewall, the first bottom wall, and the second bottom wall.

9. The engine according to claim 8, wherein:

the plate section comprises a third sidewall, a second bottom wall, and a fourth sidewall; and the second channel is defined by the third sidewall, the second bottom wall, and the fourth sidewall.

10. The engine according to claim 9, wherein the second sidewall and the second bottom wall are the same wall.

11. The engine according to claim 9, wherein:

the first sidewall of the groove section comprises a first set of attaching holds configured to enable the wire harness cover to be coupled to the engine;

the first bottom wall of the groove section comprises a second set of attaching holes coupled to the first set of clamps; and the second bottom wall of the plate section comprises a third set of attaching holes coupled to the second set of clamps.

12. The engine according to claim 11, wherein:

the plurality of clamps comprises a third set of clamps coupled to the plate section and configured to hold a third wire harness of the plurality of wire harnesses; and the fourth sidewall comprises a fourth set of attaching holes coupled to the third set of clamps.

13. An engine comprising:

a plurality of wire harnesses;

a wire harness cover comprising:
   a groove section formed by conductive walls consisting of a pair of side walls and a bottom wall configured to surround a part of an outer peripheral surface of a first wire harness of the plurality of wire harnesses, and
   a plate section extending from the groove section, the plate section fixing the wire harness cover to the engine; and a plurality of clamps comprising a first set of clamps and a second set of clamps, the first set of clamps coupled to the groove section and configured to hold the first wire harness, and the second set of clamps coupled to the plate section and configured to hold the second wire harness, wherein the first wire harness is disposed adjacent to a second wire harness of the plurality of wire harnesses with one of the pair of side walls on a side of the engine or bottom wall being interposed between the adjacent wire harnesses.

14. The engine according to claim 13, wherein the one of the pair of side walls on the side of the engine or the plate section is configured to hold the second wire harness.

15. The engine according to claim 14, wherein the first wire harness and the second wire harness are electromagnetically separated by one of the pair of side walls on a side of the engine or bottom wall.

16. The engine according to claim 13, wherein the first wire harness and the second wire harness are electromagnetically separated by one of the pair of side walls on a side of the engine or bottom wall.

17. The engine according to claim 13, wherein:

the wire harness cover comprises a first end and a second end;

the wire harness cover extends in a longitudinal direction between the first end and the second end;

the groove section defines a first channel that extends in the longitudinal direction between the first end and the second end; and the plate section defines a second channel that extends in the longitudinal direction between the first end and the second end.

18. The engine according to claim 17, wherein:

the groove section comprises a first sidewall, a first bottom wall, and a second sidewall;

the first channel is defined by the first sidewall, the first bottom wall, and the second bottom wall;

the plate section comprises a third sidewall, a second bottom wall, and a fourth sidewall; and the second channel is defined by the third sidewall, the second bottom wall, and the fourth sidewall.

19. The engine according to claim 18, wherein:

the first sidewall of the groove section comprises a first set of attaching holds configured to enable the wire harness cover to be coupled to the engine;

the first bottom wall of the groove section comprises a second set of attaching holes coupled to the first set of clamps; and the second bottom wall of the plate section comprises a third set of attaching holes coupled to the second set of clamps.

20. The engine according to claim 19, wherein:

the plurality of clamps comprises a third set of clamps coupled to the plate section and configured to hold a third wire harness of the plurality of wire harnesses; and the fourth sidewall comprises a fourth set of attaching holes coupled to the third set of clamps.

* * * * *